R. E. DE CAMP.
CONTROL SYSTEM.
APPLICATION FILED NOV. 6, 1919.
1,387,595. Patented Aug. 16, 1921.
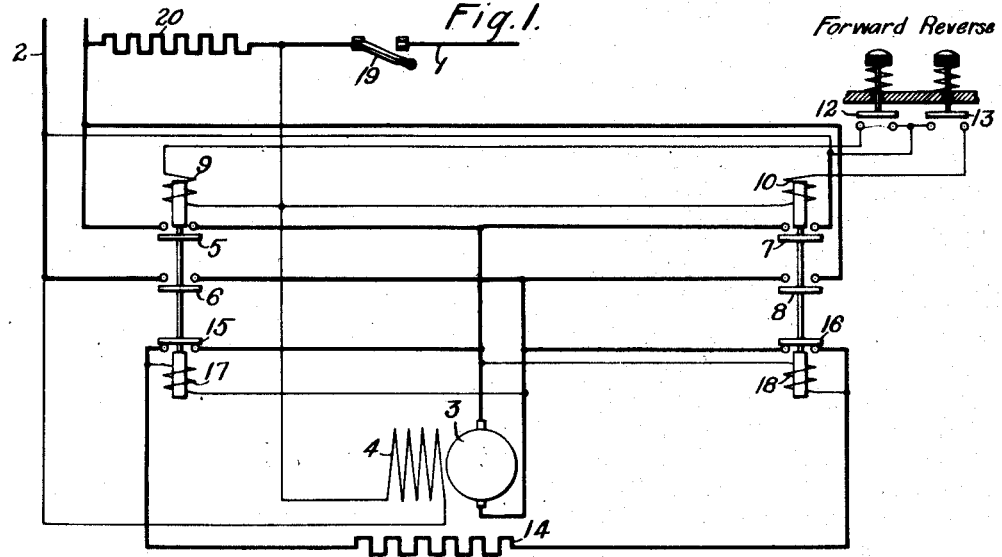
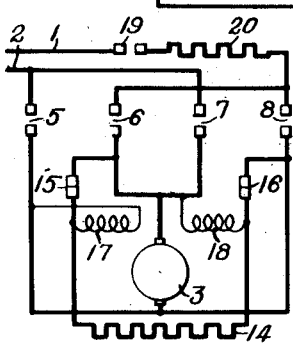
Fig. 2.
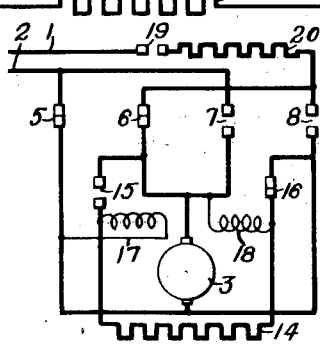
Fig. 3.
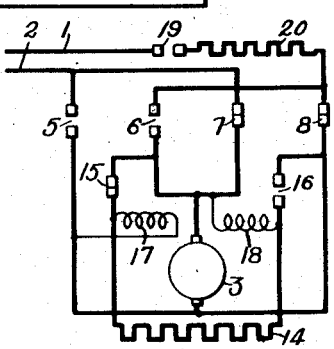
Fig. 4.
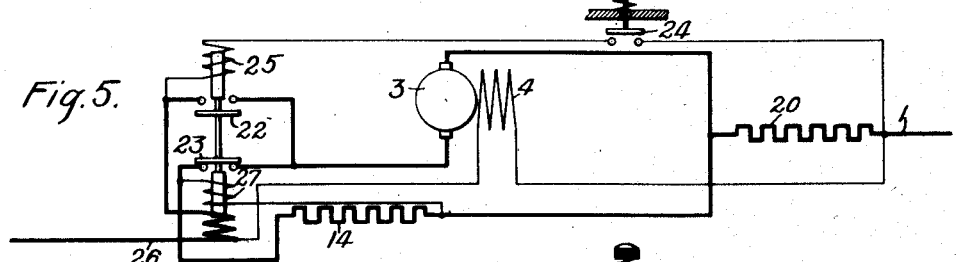
Fig. 5.
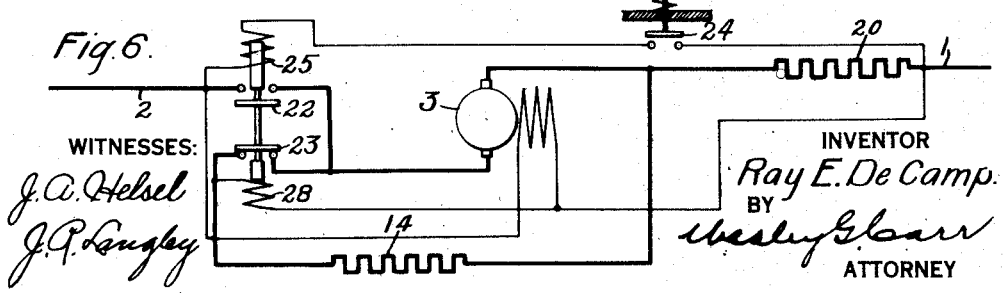
Fig. 6.
WITNESSES:
J. C. Helsel
J. P. Langley
INVENTOR
Ray E. De Camp.
BY
Wesley G. Carr
ATTORNEY

UNITED STATES PATENT OFFICE.

RAY E. DE CAMP, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,387,595.      Specification of Letters Patent.      Patented Aug. 16, 1921.

Application filed November 6, 1919. Serial No. 336,012.

*To all whom it may concern:*

Be it known that I, RAY E. DE CAMP, a citizen of the United States, and a resident of Wilkinsburg, in the county of Allegheny and State of Pennsylvania, have invented a new and useful Improvement in Control Systems, of which the following is a specification.

My invention relates to control systems and particularly to means for stabilizing the positions of the movable members of switches for controlling circuits embodied therein.

My invention has for its object to provide a simple and efficient means for preventing the oscillation or movement of movable switch members from the positions to which they may be adjusted.

In the operation of switches for controlling the circuits of electric motors and other electrical devices, it may occur that the movable members of such switches do not remain in the positions to which they are adjusted by reason of the fact that no forces are applied to them for this specific purpose. The structures of line switches and reversing switches usually comprise springs or other resilient devices which may cause the switches to oscillate when they are permitted to open by force of gravity.

If, for example, the circuit of an electric motor under heavy load is opened by a line switch, it may occur that the recoil of the movable switch member, upon opening, is sufficient to cause an arc to be drawn across the contact members of the switch. It may occur, also, that a switch member may be operated manually or by some external force in such manner as to cause a dangerous short circuit. The current traversing such arcs may be of sufficient value to not only damage the contact members of the switch, but, also, to continue the operation of the motor.

In accordance with the present invention, I provide electromagnetic means for retaining the switches for controlling circuits of electric motors in their open positions. The electromagnetic means may be energized during such time as the motor is in operation, but, in the preferred form of my invention, the circuits are so arranged that the holding coils are energized only when the corresponding switches are in the positions in which it is desired to retain them.

In the accompanying drawing, Figure 1 is a diagrammatic view of circuits and apparatus embodying my invention; Figs. 2, 3 and 4 are schematic diagrams of the system of Fig. 1; Figs. 5 and 6 are views similar to modifications of the system of Fig. 1.

Referring to Figs. 1, 2, 3 and 4, line conductors 1 and 2, which may be connected to any suitable source of direct current, supply energy to an electric motor, the armature of which is indicated at 3 and which has a shunt field magnet winding 4. The armature circuits of the motor are controlled by two pairs of mechanically-connected reversing switches 5 and 6 and 7 and 8 that are respectively provided with actuating coils 9 and 10. The coils 9 and 10 are respectively controlled by push-button switches 12 and 13 that are designated by the legends "forward" and "reverse," respectively, to indicate the corresponding direction of operation of the motor.

A dynamic-braking circuit for the motor, which includes a dynamic-braking resistor 14, is controlled by switches 15 and 16 that are respectively interlocked with the pairs of reversing switches. The pairs of reversing switches are respectively provided with holding coils 17 and 18 which are connected across the motor armature and are, therefore, energized in accordance with the counter electromotive force of the motor. The circuit of each of the holding coils is controlled by the corresponding dynamic-braking switch.

To operate the motor, a line switch 19 is closed and one of the push-button switches is depressed to effect the operation of the motor in the desired direction. It may be assumed that the push-button switch 12 is actuated to complete a circuit for the actuating coil 9 and thereby effect the closing of reversing switches 5 and 6. The armature circuit then extends from line conductor 1 through switch 19, starting resistor 20, switch 5, armature 3 and switch 6 to line conductor 2.

During the normal operation of the motor, when the circuits are arranged as described above, the coil 18 is connected across the motor armature, its circuit comprising the dynamic-braking switch 16. The coil 18 is, accordingly, energized in accordance with the counter electromotive force of the armature to retain the switches 7 and 8 in their respective open positions. It is impossible, therefore, to effect the closing of switches 7 and 8 by depressing the push-button switch 13 while the counter electromotive force of the motor is above a predetermined value. In other words, it is impossible to damage the motor by accidental or inadvertent actuation of the push-button switch for effecting the reversal of the motor while the latter is operating. It is impossible, also, for the switches 7 and 8 to be closed accidentally or inadvertently, either from jar or other cause.

To stop the motor, the push-button switch 12 is released and the actuating coil 9 is deenergized. The switches 5 and 6 are opened by force of gravity and the switch 15 closes to complete the dynamic-braking circuit of the motor which extends from the armature 3 through switch 15, dynamic-braking resistor 14 and switch 16 to the armature 3. The closing of switch 15 also completes a circuit for the holding coil 17 and the latter is energized in accordance with the electromotive force generated by the motor armature during the period of dynamic braking.

Since, under normal conditions, the motor is operating at relatively high speed upon the opening of its circuit, the coil 17 will be immediately energized to such degree that the switch 15 will be retained in its closed position, and the switches 5 and 6 are, accordingly, held in their respective open positions. The recoil of the switches 5 and 6 from their respective closed positions and their oscillation between their open and their closed positions is thereby effectually prevented.

The coil 18 is energized during the operation of dynamic braking in accordance with the electromotive force generated by the motor armature. The reversal of the motor, while it is operating at such speed that it may be damaged, is effectually prevented by the holding coil 18. When the difference in potential across the terminals of the motor armature is substantially of zero value, the coils 17 and 18 are deënergized. The motor may then be operated in the desired direction by depressing the corresponding push-button switch, the coils 17 and 18 being ineffective until the circuit of the motor is closed.

Fig. 2 represents the arrangement of the motor circuits during the period of rest or of dynamic braking. Fig. 3 represents the arrangement of the circuits when the push-button switch 12 is depressed to effect the closing of switches 5 and 6 and the opening of dynamic-braking switch 15. When the push-button switch 13 is actuated to effect the closing of switches 7 and 8 and the opening of switch 16, the arrangement is that illustrated in Fig. 4.

Reference may now be had to Fig. 5 in which a modification of my invention is illustrated. Similar numerals are employed to designate corresponding parts. In this form of my invention, a single line switch 22 controls the main circuit of the motor. A single dynamic-braking switch 23, which is mechanically connected to the switch 22, controls the dynamic-braking circuit of the motor.

A push-button switch 24 is depressed to complete a circuit for the actuating coil 25 of switch 22. The latter closes to complete the armature circuit of the motor which extends from line conductor 1 through resistor 20, armature 3, switch 22 and series holding coil 26 to line conductor 2. The switch 22 closes before the series holding coil 26 is energized and the latter is not effective to open the switch by reason of the fact that the core member coacting with the coil 26 is without the magnetic field of the latter when the switch 22 is in its closed position.

To stop the motor, the push button switch 24 is released to open the circuit of the coil 25. The switches 22 and 23 are actuated, by force of gravity, to their respective open and closed positions. If it should occur that the switches recoil from the latter positions and switch 22 approaches its closed position to such degree that an arc is drawn between the contact members, the value of the current traversing such arc and the coil 26 is such as to energize the latter to retain the switch 22 in its open position.

The closing of switch 23 completes the dynamic-braking circuit of the motor armature through resistor 14. A coil 27, which is in shunt relation to the dynamic-braking resistor 14, is energized in accordance with the difference in potential across the terminals of the resistor 14 and this coil serves to retain the switches in their respective illustrated positions while the current traversing the dynamic-braking circuit exceeds a predetermined value.

It will be noted that the coils 26 and 27 are not energized simultaneously except during the prevalence of an arc between the contact members of the switch 22 when the switch 23 is in its closed position. This is an abnormal condition, however, and one unlikely to obtain. The coil 27 is energized immediately upon the closing of the dynamic-braking circuit and is effective so long as the electromotive force of the armature 3 exceeds a predetermined value.

In the system illustrated in Fig. 6, a single holding coil 28 is connected across the motor armature and the starting resistor 20. When the push-button switch 24 is closed, the actuating coil 25 is energized to effect the closing of line switch 22 and the opening of dynamic-braking switch 23 which is mechanically connected thereto. The armature circuit of the motor is then completed through switch 22 and the starting resistor 20. As described above in connection with the system of Fig. 5, the line switch 22 closes before the holding coil is energized, and the core member, coacting with the holding coil, is withdrawn from the magnetic field of the latter.

The motor is brought to rest by releasing the push-button switch 24 to effect the opening and closing of switches 22 and 23, respectively. The motor is then decelerated by dynamic braking. The coil 28 is energized in accordance with the electromotive force of the motor armature 3, as measured by the difference in potential across the motor armature and the resistor 20. The switches are accordingly retained in their respective illustrated positions while the current traversing the dynamic-braking circuit exceeds a predetermined safe value. During such period as the current exceeds the predetermined safe value, the push button switch 24 is ineffective to again start the motor.

It will be noted that I provide simple and efficient means for effectually preventing the operation of the controlling switches of electric motors under such conditions as may cause damage to the motor. The switches are retained in their proper positions by coils which are energized at desired times. The oscillation of the switches and the damage which may result therefrom, as well as the delay which may be caused by the failure of the switches to remain in their adjusted positions, are effectually prevented.

While I have shown and described my invention in connection with the switches for controlling the circuits of electric motors, it will be appreciated by those skilled in the art that it may be employed in connection with circuits for controlling other devices in which similar conditions may obtain.

I claim as my invention:

1. In a motor-control system, the combination with an electric motor and a controlling switch therefor, of means for retaining said switch in its open position when the voltage across the armature of said motor exceeds a predetermined value, said means comprising a coil in shunt relation to said motor armature.

2. In a motor-control system, the combination with an electric motor and a controlling switch therefor, of means for retaining said switch in its open position when the voltage across the armature of said motor exceeds a predetermined value, said means comprising a coil in shunt relation to said motor armature and which is energized only when said switch is in its open position.

3. In a motor-control system, the combination with an electric motor, and two mechanically-connected controlling switches therefor, of means comprising a coil in shunt relation to the armature of said motor and controlled by one of said switches for retaining the other of said switches in open position.

4. In a motor-control system, the combination with an electric motor and a switch for controlling its normal operating circuit, of a switch for controlling a dynamic-braking circuit for the motor, and means comprising a coil in shunt relation to the motor armature and controlled by the second switch for retaining the first switch in open position.

5. In a motor-control system, the combination with an electric motor and two reversing switches therefor, of means controlled in accordance with the respective positions of said switches for retaining each of them in its open position, said means comprising a coil for each of said switches that is energized only when the corresponding switch is open, each of said coils being connected in shunt relation to the armature of said motor.

6. In a motor-control system, the combination with an electric motor and a plurality of switches for controlling the normal operating circuits of said motor, of a switch for controlling a dynamic-braking circuit for said motor, and means comprising a coil in shunt relation to the armature of said motor and controlled by said switch for retaining one of said switches in open position.

7. In a motor-control system, the combination with an electric motor and a plurality of switches for controlling the normal operating circuits of said motor, of a switch for controlling a dynamic-braking circuit for said motor, and means comprising a coil in shunt relation to the armature of said motor and controlled by said switch for retaining one of said switches in open position so long as the voltage across the motor armature exceeds a predetermined value.

8. In a motor-control system, the combination with an electric motor and a plurality of switches for controlling the normal operating circuits of said motor, of two switches respectively mechanically connected to one of said controlling switches and operable to complete a dynamic-braking circuit for said motor when the controlling switches are open, and a coil controlled by each of said dynamic-braking switches for retaining the corresponding controlling switch in open position during both the normal operation and the dynamic braking of said motor, said coils being connected in shunt relation to the motor armature.

9. The combination with an electric motor and reversing means therefor comprising a plurality of switches, of means responsive to the value of the voltage across the motor terminals for maintaining said switches open.

In testimony whereof, I have hereunto subscribed my name this 24th day of Oct., 1919.

RAY E. DE CAMP.